United States Patent [19]

Martin

[11] Patent Number: 5,152,658
[45] Date of Patent: Oct. 6, 1992

[54] HYDROSTATIC SYSTEM FOR LIFT TRUCK

[75] Inventor: Louis E. Martin, Compiegne, France

[73] Assignee: Poclain Hydraulics, France

[21] Appl. No.: 667,662

[22] Filed: Mar. 11, 1991

[30] Foreign Application Priority Data

May 4, 1990 [FR] France .................. 90 05671

[51] Int. Cl.$^5$ .............................. B66F 9/06
[52] U.S. Cl. .................. 414/635; 188/170;
188/71.4; 188/72.3; 187/9 R; 180/24.04;
180/242; 180/367; 414/632
[58] Field of Search .............. 414/628, 629, 630, 631,
414/632, 633, 634, 635, 636, 637; 187/9 R, 9 E;
188/72.3; 180/308, 367, 6.3, 24.04, 242, 244

[56] References Cited

U.S. PATENT DOCUMENTS

| | | |
|---|---|---|
| 3,005,562 | 10/1961 | Shaffer . |
| 3,098,574 | 7/1963 | DeMarco .................. 414/635 |
| 3,219,219 | 11/1965 | Singer et al. .................. 414/635 |
| 3,376,990 | 4/1968 | Latall .................. 414/634 |
| 3,439,766 | 4/1969 | Dence et al. . |
| 3,721,318 | 3/1973 | Warrender .................. 414/635 X |
| 3,831,718 | 8/1974 | Muller et al. .................. 188/170 |
| 3,863,038 | 1/1975 | Kreitner et al. .................. 188/170 |
| 4,207,968 | 6/1980 | Chamberlain .................. 188/71.4 |

FOREIGN PATENT DOCUMENTS 203688 12/1986 European Pat. Off. .
1215143 4/1960 France .................. 414/635

Primary Examiner—Frank E. Werner
Attorney, Agent, or Firm—Mark T. Basseches

[57] ABSTRACT

This invention relates to a hydrostatic axle for a lift truck comprising a frame, two displacement members coupled to motors and a mast for handling mounted to pivot with respect to said frame, this axle comprising two drive assemblies, right- and left-hand, each comprising a hydrostatic motor and a brake and being coupled to one of said displacement members. According to the invention, a) each of the motors is a slow motor coupled to the corresponding displacement member without the interposition of a speed reducer; b) the two motors and the two brakes are contained in a single resistant beam fixed on the frame of the list truck; and c) the handling mast is pivitally mounted on said beam via at least two pivot bearings. One application of the invetion is the economical production of a resistant lift truck.

7 Claims, 4 Drawing Sheets fig_3

HYDROSTATIC SYSTEM FOR LIFT TRUCK

FIELD OF THE INVENTION

The present invention relates to a hydrostatic system for lift truck.

BACKGROUND OF THE INVENTION

A lift truck is already known which presents a hydrostatic axle comprising a frame, two displacement members coupled to motors and a mast for handling mounted to pivot with respect to said frame, this axle comprising two drive assemblies, right- and left-hand, each comprising a hydrostatic motor and a brake and being coupled to one of said displacement members.

In this known lift truck, the hydrostatic motors are rapid motors, necessarily associated with speed reducers, the assembly being sheltered in a voluminous housing, itself rigidly fixed to the thermal engine for driving the hydraulic pump supplying the hydrostatic motors. The handling mast is pivotally mounted directly with respect to the frame of the truck.

This construction is heavy, expensive and does not allow simple assembly, either of the axle itself or of the mast, on the lift truck.

It is an object of the invention to overcome these drawbacks by eliminating the speed reducers thanks to the adoption of slow hydrostatic motors and by providing the pivotal assembly of the mast with respect to the axle itself.

SUMMARY OF THE INVENTION

The following features are provided according to the invention:

(a) each of the motors is a slow motor coupled to the corresponding displacement member without the interposition of a speed reducer;

(b) the two motors and the two brakes are contained in a single resistant beam fixed on the frame of the lift truck; and (c) the handling mast is pivotally mounted on said beam via at least two pivot bearings.

The following advantageous arrangements are, in addition, preferably adopted:

- the brakes are located between the two pivot bearings;

- the beam is fixed to the chassis by two fixing flanges which are each contained in a plane substantially perpendicular to the driven shafts of the two motors;

- in each motor-assembly, the motor comprises a frame fast, with respect to rotation, with the single beam and a driven shaft mounted to rotate with respect to said frame, the brake of said motor-assembly comprising, on the one hand, a stack of brake discs, on the other hand, an elastic member for thrust of the brake discs of said stack, whilst the elastic members of the brakes of the two motor-assemblies abut on one another by reaction;

- a reaction ring is interposed between said elastic members.

The principal advantage of the invention lies in the small dimensions, the saving in weight and the appropriate rigidity of the hydrostatic axle, as well as in the simple assembly thereof.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
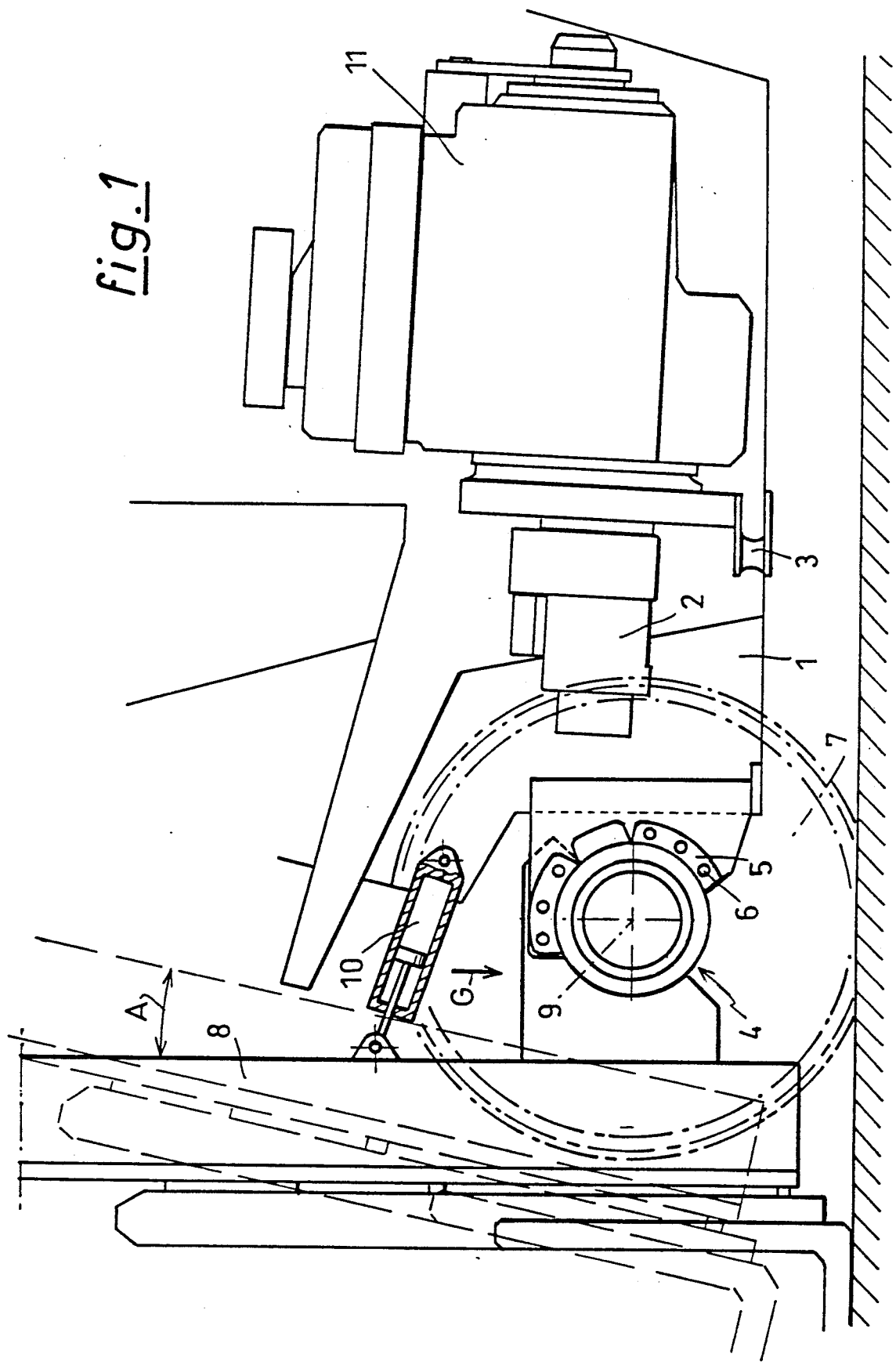
FIG. 1 is a view in elevation of a lift truck according to the invention.

Referring now to the drawings, FIG. 1 shows the front part of a lift truck comprising:

- the frame 1 proper of the truck;

- a thermal engine 11, of the "Diesel" type, to which is coupled a hydraulic pump 2, and which is mounted, in the present case by means of elastic supports 3, on the frame 1;

- a drive axle 4, which is fixed on the frame 1 by flanges 5 and bolts 6;

- front wheels 7 fixed to the ends of the drive axle 4;

- a mast 8 for handling which is mounted to pivot about the geometrical axis 9 of the drive axle 4, a jack 10 being coupled between this mast 8 and the frame 1 and being adapted to adjust the inclination of said mast 8 with respect to the vertical direction (angular clearance A, at the most equal to 12°).

Figure 2:
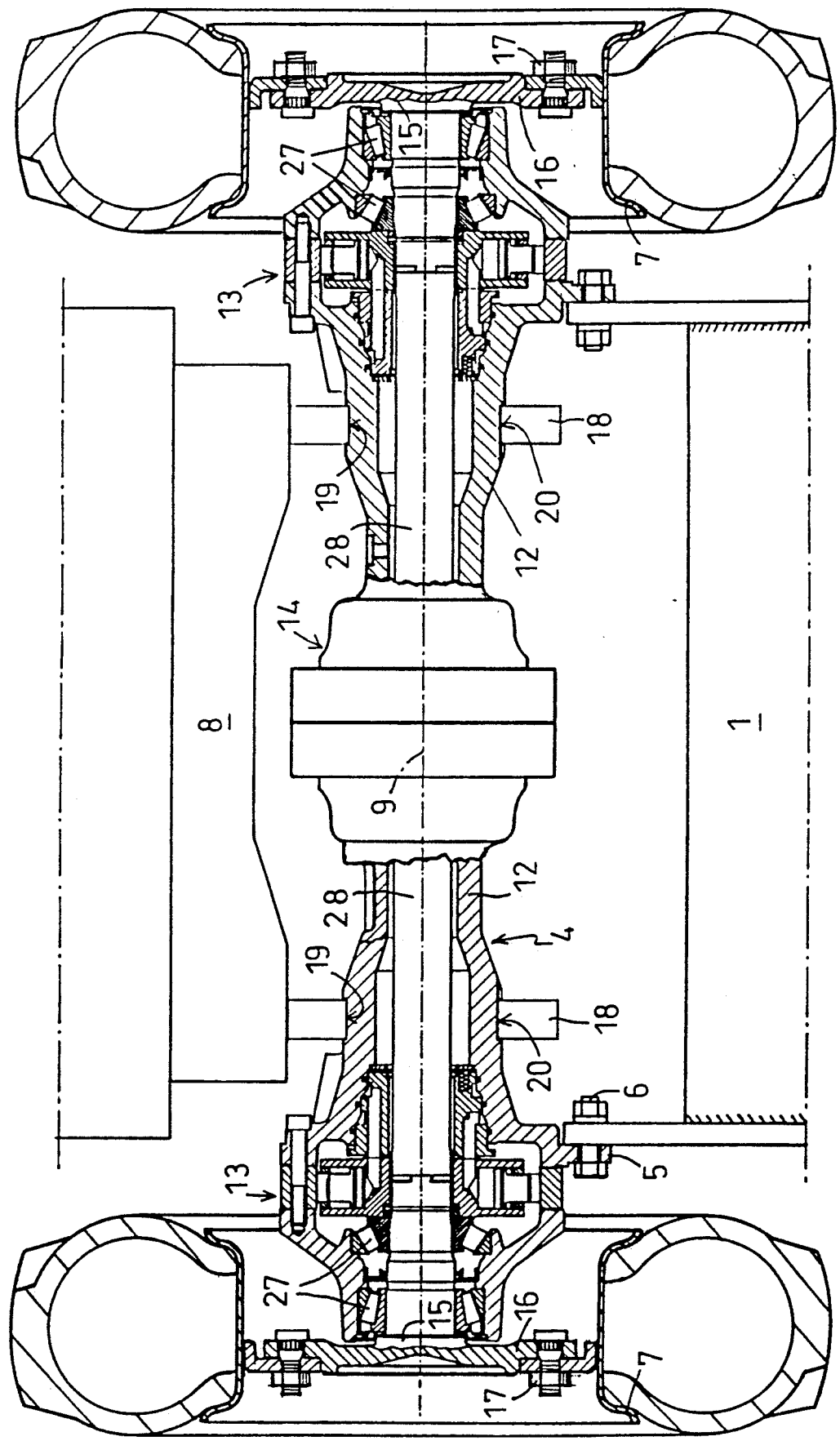
FIG. 2 is a view in the direction of arrow G of FIG. 1.

FIG. 2 shows the constitution of the drive axle which comprises:

- a single beam 12, in each of the ends of which is housed a hydrostatic motor 13;

- a median swelling 14 which shelters disc brakes;

- two drive shafts 15 which constitute the driven shafts of the two hydrostatic motors 13 and which support end plates 16 on which the wheels 7 are fixed by nuts 17, the flanges 5 being contained in planes perpendicular to the axis 9 of the shafts 15. The shafts 15 are mounted for rotation (bearing 27) in and with respect to the beam.

FIG. 2 shows the pivoting assembly of the handling mast 8 directly on the beam 12, by means of two arms 18 fast with the mast 8 and which extend perpendicularly to axis 9 of the shafts 15 and are provided with bores 19 constituting smooth bearings for two bearing surfaces 20 made on the outer face of the beam 12.

Moreover, it should be noted that, in the embodiment shown, the axes of bores 19 merge with the geometrical axis 9 of the drive axle 4; this is a particular, non-limiting embodiment of the invention. Other embodiments according to the invention have already been studied, in which pairs of journal assembly tabs are fast with the beam 12 and allow the assembly of journals eccentric with respect to the geometrical axis 9, these journals cooperating with other tabs fast with the mast 8, in order to effect the pivotal assembly of the mast 8 about the axes of journals. This variant embodiment conserves the principal advantage connected with the direct assembly of the mast on the beam, which resides especially in an already considerable ease of assembly of the mast 8 and of the beam 12, whilst further facilitating the pivotal assembly of the mast 8 with respect to the beam 12. In particular, it becomes possible, with this variant embodiment, to mount the mast 8 on one side only of the beam 12 with respect to the geometrical axis 9, avoiding having to surround this beam 12 with the bores 19 of the embodiment shown in FIGS. 2 and 3.

Figure 3:
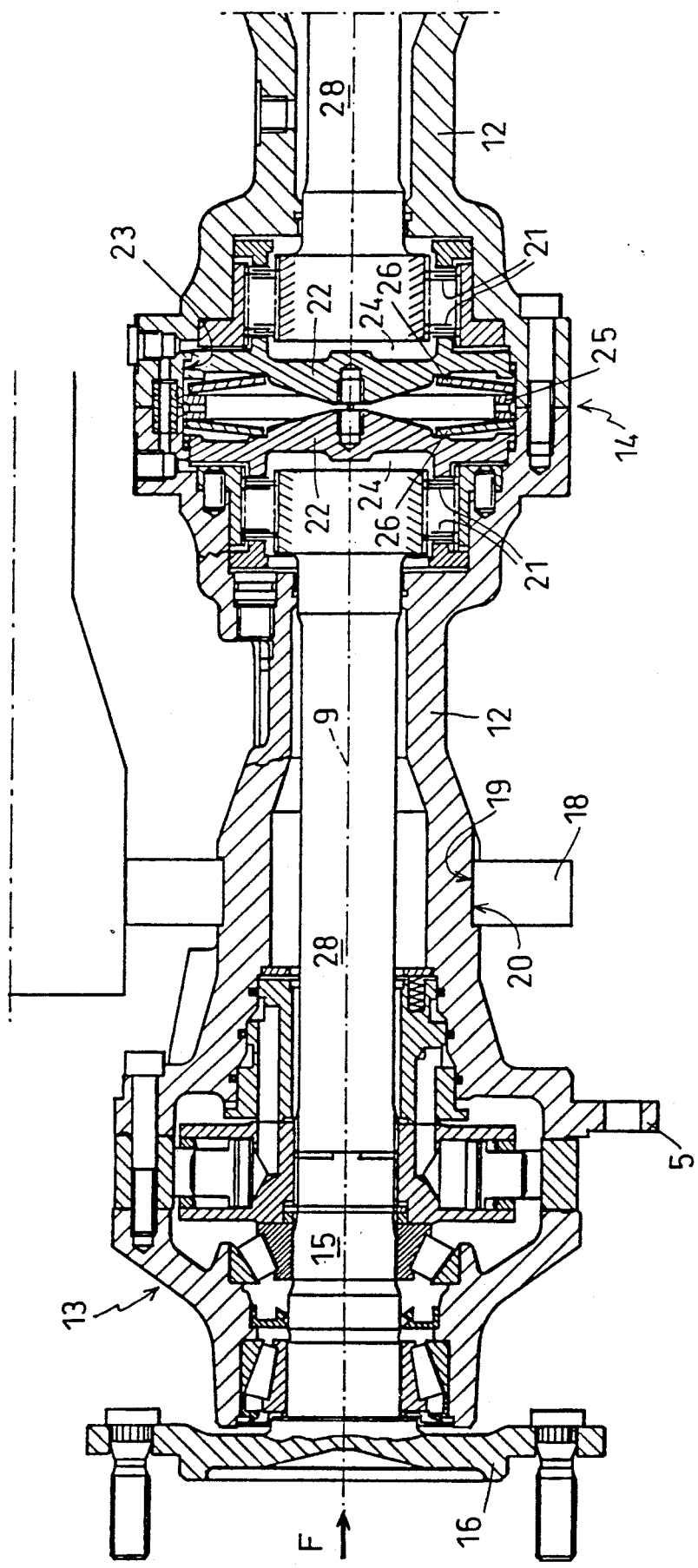
FIG. 3 is a partial longitudinal section through the axle of FIG. 2.

The section of FIG. 3 shows the conventional details of the hydrostatic motors 13, as well as the driven shaft 15 of the hydrostatic motor 32 located to the left of the Figure. Another shaft 28, fast in rotation with shaft 15 and emerging on the side opposite that of the plate 16 for fixing the wheels, is provided with a set of brake discs which is contained inside the swelling 14 and which, with a second set of brake discs fast with the beam 12, constitutes a stack 21 of brake discs. In the embodiment shown, a covering cap 22, inside beam 12, mounted to slide inside a bore 23 of this beam, defines with said beam 12 a chamber 24 inside which the stack 21 is contained. This covering cap 22 constitutes a part for thrust of the brake discs of the stack 21. The covering caps 22, disposed opposite the inner ends of the two shafts 15, are in addition disposed opposite one another. A reaction ring 25 mounted to rotate freely between these two covers 22, constitutes an abutment for two elastic washers 26, forming springs, each interposed between said reaction ring 25 and a covering cap 22. The elastic effect of the washers 26 is precisely to push the covering caps 22 towards the respective stacks 21 in the sense leading to braking rotation of the corresponding shaft 28 with respect to beam 12. Each brake constitutes a safety brake, of which the brake-release chamber is constituted by chamber 24.

Figure 4:
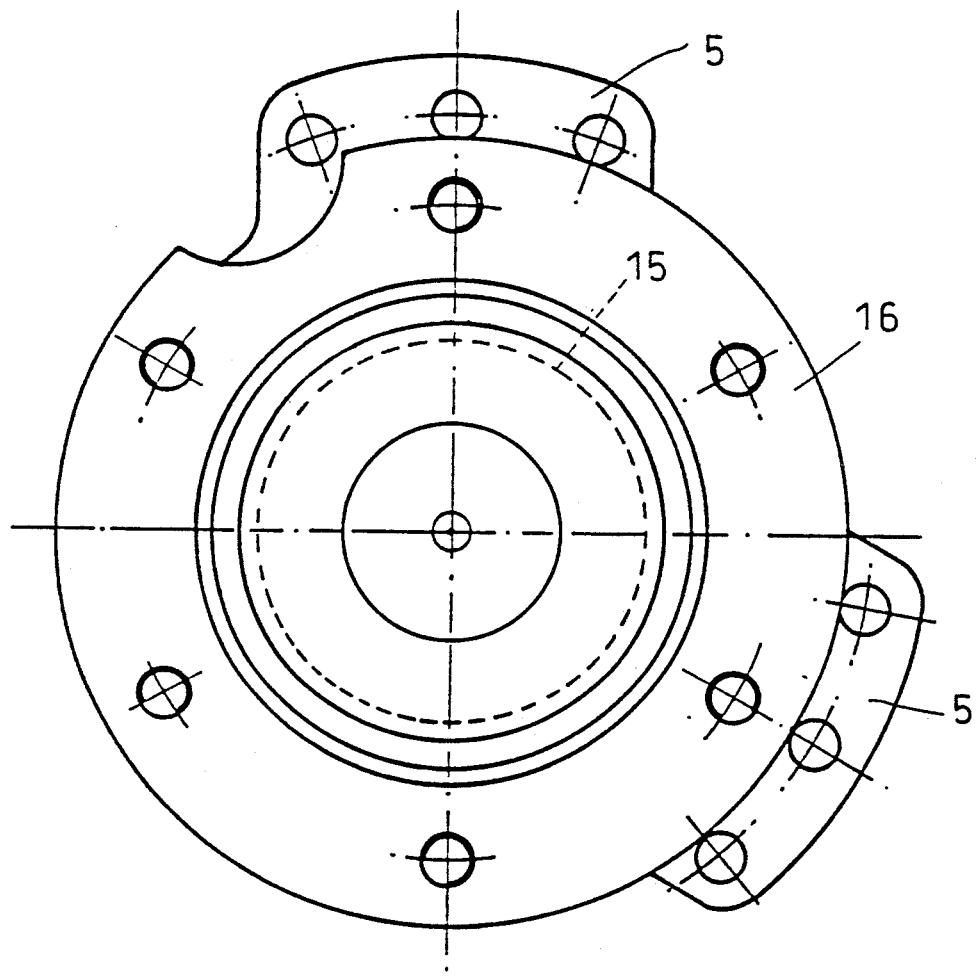
FIG. 4 is a view in the direction of arrow F of FIG. 3.

With regard to FIG. 4, it should be noted that the swelling 14 which shelters the brake discs 21 and the control thereof (chamber 24, elastic washer 26), is located in central position of the beam 12, between the two bearings 19-20 of the pivoting assembly of the handling mast 8 on the beam 12.

The invention which has just been described therefore makes it possible, by adopting slow hydrostatic motors 13, adapted to drive the wheels 7 directly without the interposition of speed reducers and of associated brakes, to house the assembly in one sole beam 12, which is fixed (5-6) on the frame 1 of the lift truck independently of the thermal engine 11 and the hydraulic pump 2.

This arrangement is less cumbersome and lighter than those known heretofore, and is also easier to instal than the one in which the drive axle housing is fast with the thermal engine.

Furthermore, the pivoting assembly of the handling mast 8 directly on the beam 12 renders assembly easier. The rigidity of the beam 12 allows such an assembly.

Finally, the safety brakes 14-21 are coupled to the wheels 7 without any gearing down, directly by means of shafts 15 and 28 of the hydrostatic motors 13, which is a token of efficiency and reliability.

The invention is not limited to the embodiment shown, but covers, on the contrary, all the variants which may be made thereto without departing from its scope nor its spirit.

What is claimed is:

1. A hydrostatic axle assembly adapted to be mounted to a frame of a lift truck comprising a hollow tubular axle member, displacement means for propelling said truck mounted at opposite ends of said axle member for rotation about an axis coaxial with an axis of said axle member, first and second motor means mounted within said hollow axle, each said motor means including a frame fixed to said axle and a drive shaft coaxial with the axis of said axle member, each said drive shaft being directly coupled to one of said displacement means, a brake housing fixed to said tubular axle, brake means disposed within said housing and operatively connected to said drive shafts for applying a variable frictional drag between said drive shafts and said axle member, spaced bearing means mounted on an exterior of said axle member, and a mast assembly pivotably supported on said bearing means.

2. An axle assembly in accordance with claim 1 wherein said brake housing is located between said bearing means.

3. An axle assembly in accordance with claim 1 wherein said bearing means is coaxially disposed with respect to the axis of said axle member.

4. An axle assembly in accordance with claim 2 and including a spaced pair of mounting flange means fixed to the exterior of and disposed in a plane perpendicular to the axis of said axle for mounting said axle assembly to the frame of the truck.

5. An axle assembly in accordance with claim 1, wherein said brake housing is a component of said tubular axle.

6. An axle assembly in accordance with claim 1, wherein said brake housing is disposed between said motor means, said brake means comprising brake discs and an elastic member for thrust of the brake discs, the elastic members of the two brake means abutting on one another.

7. An axle assembly in accordance with claim 6, wherein a ring of reaction is interposed between said elastic member of the two brake means.

* * * * *